(12) United States Patent
Fecteau

(10) Patent No.: US 7,842,257 B2
(45) Date of Patent: Nov. 30, 2010

(54) FLUID DISTRIBUTOR FOR RADIAL-FLOW REACTOR

(75) Inventor: David J. Fecteau, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 445 days.

(21) Appl. No.: 11/956,959

(22) Filed: Dec. 14, 2007

(65) Prior Publication Data

US 2009/0155144 A1  Jun. 18, 2009

(51) Int. Cl.
*B01J 8/02* (2006.01)
*B01J 35/02* (2006.01)

(52) U.S. Cl. .................... 422/211; 422/216; 422/218; 422/221

(58) Field of Classification Search ........... 422/211, 422/216, 218, 221
See application file for complete search history.

(56) References Cited

U.S. PATENT DOCUMENTS

| | | | | |
|---|---|---|---|---|
| 4,167,553 A | | 9/1979 | Persico et al. ............ 422/216 |
| 4,374,095 A | * | 2/1983 | Legg et al. ............... 422/218 |
| 5,015,383 A | * | 5/1991 | Evans et al. ............. 210/497.1 |
| 5,366,704 A | | 11/1994 | Koves et al. ............. 422/218 |
| 6,106,696 A | * | 8/2000 | Fecteau et al. ............ 208/64 |
| 6,221,320 B1 | * | 4/2001 | Nagaoka .................. 422/218 |
| 6,224,828 B1 | * | 5/2001 | Lin et al. .................. 422/33 |
| 6,224,838 B1 | | 5/2001 | Schulz et al. ............. 422/218 |
| 6,620,386 B1 | * | 9/2003 | Welch ....................... 422/192 |
| 6,982,067 B2 | * | 1/2006 | Ward ........................ 422/216 |
| 7,125,529 B2 | * | 10/2006 | Ablin ........................ 422/211 |
| 7,226,568 B1 | * | 6/2007 | Ham et al. ................ 422/218 |
| 7,544,335 B2 | * | 6/2009 | Scanlon et al. ........... 422/218 |

FOREIGN PATENT DOCUMENTS

EP  1 265 696 B1  12/2005
WO  WO 2006/058060 A2  6/2006

* cited by examiner

*Primary Examiner*—N. Bhat
(74) *Attorney, Agent, or Firm*—Mark Goldberg

(57) ABSTRACT

The distribution of fluids within a radial-flow reactor is improved using vertically extended cylinders distributed around the circumference of the vessel. Cylinders with a circular cross-section provide substantial vertical strength, and the configuration minimizes low-flow areas which could cause undesirable reactions. The cylinders are isolated from particles in the reactor by a particle-retaining outer conduit. The cylinders may be fabricated in panels for ease of installation and servicing.

5 Claims, 5 Drawing Sheets

FLUID DISTRIBUTOR FOR RADIAL-FLOW REACTOR

FIELD OF THE INVENTION

This invention relates generally to devices for contacting particulate materials with fluids. More specifically, the invention relates to the design of the internals of reactors for fluid-particle contact.

GENERAL BACKGROUND AND RELATED ART

Numerous processes use radial flow reactors to effect the contacting of particulate matter with a gaseous stream. These processes include hydrocarbon conversion, adsorption, and exhaust gas treatment. These reactors contain a vertically extending annular bed of particles through which the gases flow radially in an inward or outward direction. The annular bed is formed by an outer screen element located along the outer diameter of the particle bed and an inner screen element located along the inner diameter of the particle bed. The outer screen element alternatively may comprise a series of closed conduits having an oblong cross-section that circles the outside of the particle bed and borders the inside of the particle containing vessel, such that the backs of the conduits will fit closely against the wall of the vessel and thereby minimize the volume between the back of the conduit and the vessel. An alternative design uses a section of profile wire or screen to form conduits positioned against the inner wall of a vessel. Such conduits have an inner wall joined to a pair of side wall portions, generally in a trapezoidal configuration.

However, the known art has failed to address issues of flow distribution and axial and radial stresses in a cost-effective way

SUMMARY OF THE INVENTION

A broad embodiment of the present invention provides an improved device for distributing fluid in a radial-flow direction through particles within a vertically extended vessel having a curved vessel wall, a fluid inlet and a fluid outlet, comprising a plurality of vertically extended cylinders arranged circumferentially about the interior of the vessel wall, each cylinder having a hollow interior and a multiplicity of cylinder perforations, and at least one end of each cylinder communicating with one of the fluid inlet and the fluid outlet; a particle-retaining outer conduit substantially parallel to the vessel wall and adjacent to the cylinders in the direction of the center of the reactor and having a multiplicity of conduit perforations; and a perforated central conduit located in the center of said vessel and communicating with the other of said fluid inlet and said fluid outlet that is not communicating with the cylinders.

In a more specific embodiment, the invention comprises an improved device for distributing fluid in a radial-flow direction through particles within a vertically extended vessel having a curved vessel wall, a fluid inlet and a fluid outlet, comprising a plurality of vertically extended cylinders arranged circumferentially about the interior of the vessel wall, each cylinder having a hollow interior and a multiplicity of cylinder perforations; and at least one end of each cylinder communicating with one of the fluid inlet and the fluid outlet; a plurality of panels, each defined by an arcuate section of a particle-retaining outer conduit having a multiplicity of conduit perforations and connected to a plurality portion of cylinders, which portion is fewer than the number of cylinders in the device, in the direction of the center of the reactor and substantially parallel to the vessel wall; and a perforated central conduit located in the center of said vessel and communicating with the other of said fluid inlet and said fluid outlet that is not communicating with the cylinders.

DETAILED DESCRIPTION OF THE INVENTION

This invention is especially suitable to facilitate radial flow or cross flow through a bed of particles within a vessel, and can be applied to any fluid-particle contacting apparatus or process. The invention is particularly beneficial in processes where transient temperature gradients or temperature fluctuations are imposed on vessel internals, causing stresses on these internals and any catalyst particles used to effect a particular reaction. These stresses can impart both axial and radial forces on internal structures and catalyst and result from differences in thermal expansion and even steady-state operating temperatures among the materials within the reactor vessel.

The plurality of cylinders of the invention may be arranged in any configuration which is useful to distribute or collect fluids in order to effect the desired fluid-particle contact. Typically, the plurality of cylinders is arranged circumferentially inside the wall of a vessel to distribute fluids through a perforated outer conduit, across a catalyst retention space in a radial direction, and into a perforated central conduit located in the center of the vessel. In this arrangement, the cylinders communicate with the reactor inlet and the central conduit communicates with the reactor outlet. The number of cylinders in the plurality is defined by the circumference of the inner wall of the vessel, cross-sectional area for fluid flow, and size of the cylinders.

Figure 1:
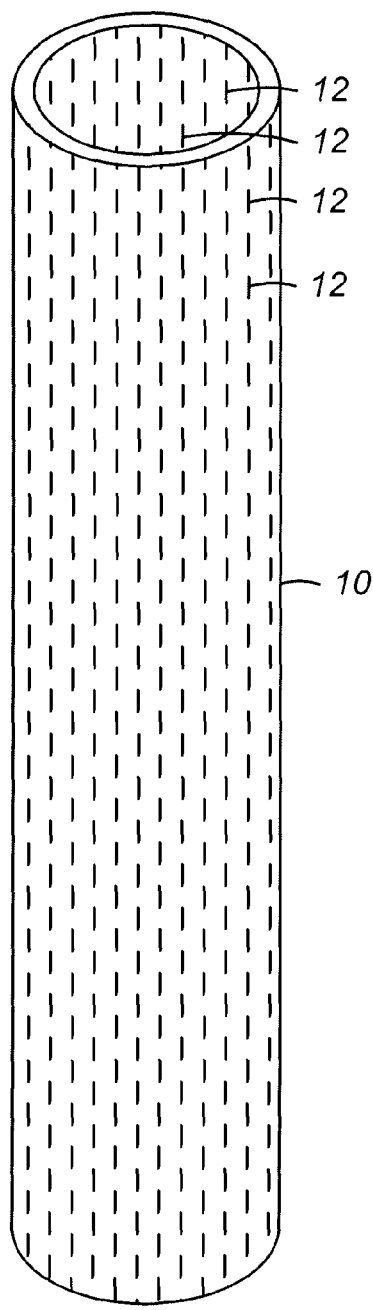
FIG. 1 is a view of a single vertically extended cylinder.

FIG. 1 shows a single vertically extended cylinder 10. The cylinder of the present invention can have any curved bounding surface which is useful to effect the desired distribution or collection of fluids. For example, the cylinder may have an oblong cross-section. However, it is preferred that the cylinder has a substantially circular cross-section. The cylinder can be fabricated from any suitable material which can be perforated in a manner to effect the transfer of fluids. Preferably the cylinder comprises a perforated extended section of standard pipe. Alternatively, the cylinder can be fabricated from a single sheet of steel which is rolled into the desired shape and welded along a vertical joint. Either the pipe or the sheet comprises a multiplicity of perforations as is known in the art to enable egress or ingress of fluids; when perforated, this material is referred to as a "perforated-plate" or "punched-plate" cylinder. The perforations 12 can be of any size or orientation for effective distribution or collection of fluids while maintaining the structural integrity of the cylinder and also being small enough to contain the catalyst particles in the event that the primary catalyst containment of outer conduit 22 is breached, and preferably are oblong or slotted in shape.

Figure 2:
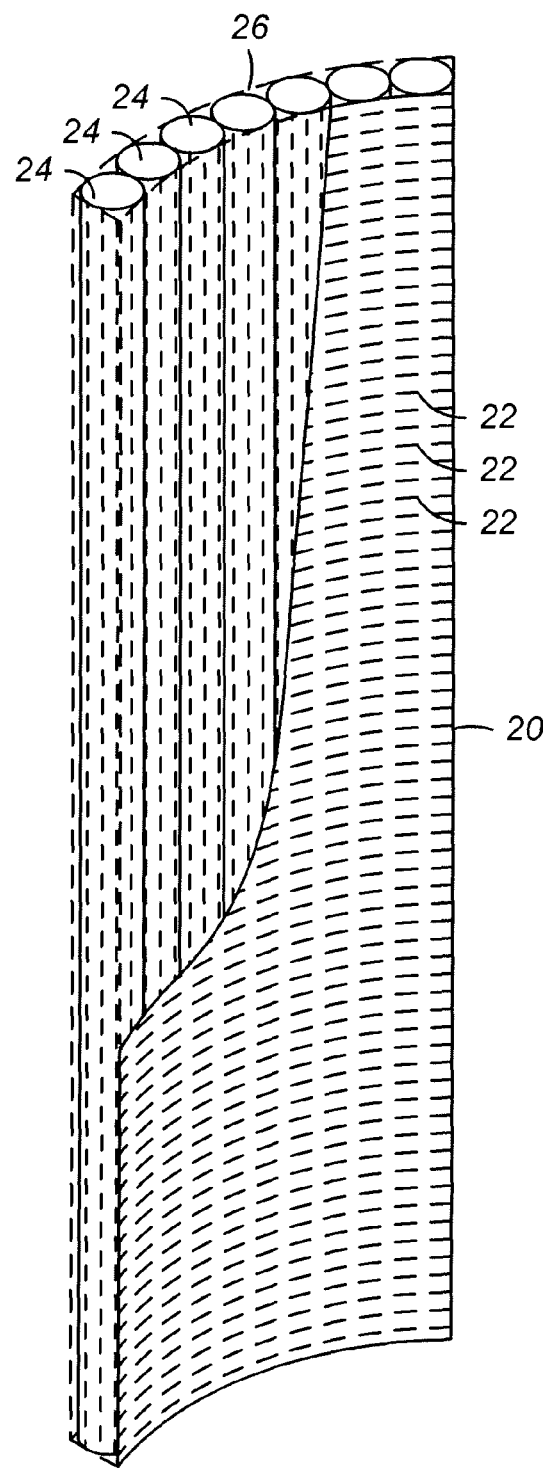
FIG. 2 is a view of a panel of cylinders.
Figure 3:
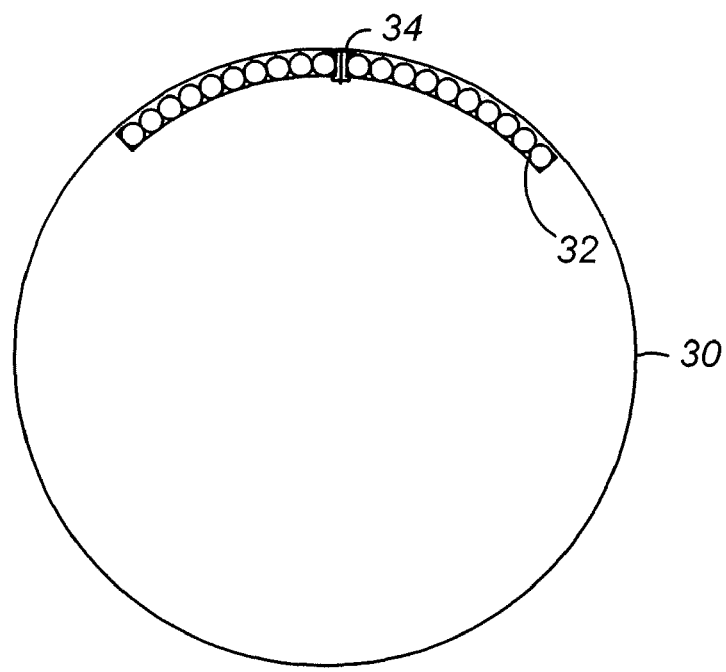
FIG. 3 is a cross-sectional view of a vessel, showing the placement of two panels of cylinders.

FIG. 2 illustrates a panel 20 of cylinders, each of which is represented as 10 in FIG. 1. The panel comprises a plurality 24 of cylinders enclosed in an arcuate section of outer conduit 22 which has been cut away partially in the drawing to show the location and orientation of the cylinders. The size of the arc of the panel is determined by the diameter of contained cylinders required for flow distribution as well as fabrication and maintenance considerations; although fabrication of the panel in situ (within the vessel) is within the scope of the invention, it is preferred that the panel would be fabricated outside the vessel and brought in via a vessel opening. The plurality of cylinders may be partially enclosed by the outer conduit 22 or may be totally enclosed in a panel comprising an enclosure conduit 26, and optionally are attached to the conduit by, for example, welding. The outer conduit and optional enclosure conduit 26 in a panel are arcuate sections of conduits within the vessel which parallel the inner vessel wall at a distance sufficient to accommodate the cylinders and conduits. The outer conduit 22 comprises a multiplicity of perforations as is known in the art to enable passage of fluids and retain particles within a particle-retaining space, preferably as perforated-plate or punched-plate steel as described above; alternatively, profile wire as described in U.S. Pat. No. 5,366,704 may be used. The enclosure conduit 26 preferably is solid, but may be partially or totally perforated sheet to prevent dead spaces of fluid between the panel and the vessel. Preferably the perforations in the cylinder and in the conduit are oriented in opposite directions to avoid complete blockage of one layer (cylinder and/or conduit) of perforations by solid portions of the other layer. When the orientation is opposite for each layer it is not possible for one layer to completely block off the other, and the total open area can be calculated reliably without using some elaborate alignment scheme FIG. 3 is a cross-sectional view of a vessel 30, showing the placement of two panels 32 of cylinders as described in FIG. 2 around the inner wall of the vessel. The panels are shown without the optional enclosure conduit shown as 26 in FIG. 2. The optional connector 34 linking the panels is further described in FIG. 4. Of course, such panels would extend all around the inner periphery of the vessel and the optional connector would extend substantially along the entire length of each panel.

Figure 4:
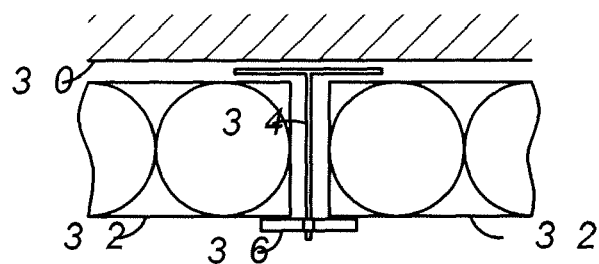
FIG. 4 is a view of a connector linking two panels of cylinders.
Figure 4:
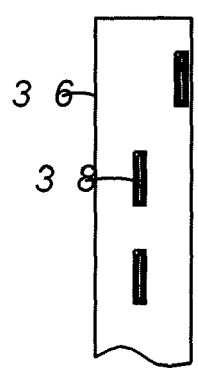

FIG. 4 is an expanded view of a connector linking two panels of cylinders. Vessel wall 30 and panel 32 relate to corresponding views in FIG. 3; in this illustration, the panel comprises the optional back shown as 26 in FIG. 2. Connector 34 is a T-bar extending the length of the panels, and preferably is fabricated from the same steel as the panels. Coverplate 36 presses against the T-bar via notches 38 and may be welded in place; the coverplate prevents particles from entering the space between the panels. This system of connectors permits the panels to expand and contract with changes in temperature inside the vessel while maintaining the integrity of the device.

Figure 5:
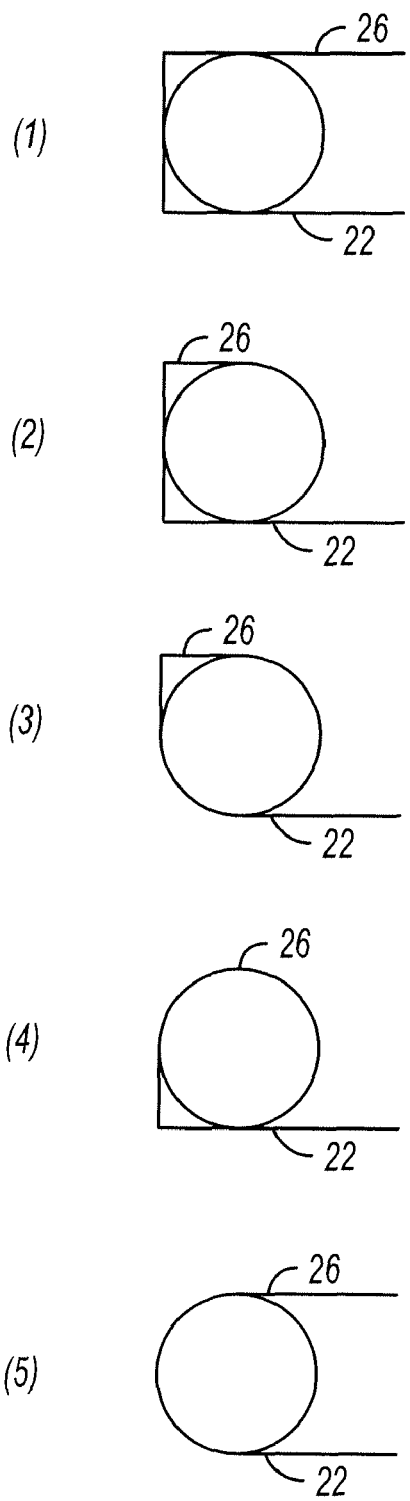
FIG. 5 shows alternative configurations for the end section of a panel

FIG. 5 shows alternative configurations for the end section of a panel of cylinders. For orientation of the end section with respect to the previous figures, the inner section adjacent to the catalyst bed of each alternative is designated as 22 to correspond to the same designation in FIG. 2. The section paralleling the vessel wall is designated as 26 to correspond to the designation in FIG. 2. Only options (1) and (2) represent an actual panel outer enclosure as shown in FIG. 2, but the designation nevertheless orients the panel with respect to its placement in a reactor. Options (1) and (2) require the largest spacing between panels because the enclosed ends require space in order to be able to insert and remove an individual panel. Options (3) and (4) provide more maneuverability through partially rounded ends. Option (5), in which the outer cylinder forms a portion of the panel wall, affords the most maneuverability and thus the closest potential spacing.

The device and the resulting advantages in the collection or distribution of fluids can be readily appreciated from in the context of an apparatus and process for reforming hydrocarbons. The description of this invention in the limited context of a specific apparatus and process, is not meant to restrict the broad application of this invention to any specific apparatus or process for fluid solid contacting.

The catalytic reforming process is well known in the art. A hydrocarbon feedstock and a hydrogen-rich gas are preheated and charged to a reforming zone containing typically two to five reactors in series. The hydrocarbon feed stream that is charged to a reforming system comprises naphthenes and paraffins boiling within the gasoline range. The preferred class of feed streams includes straight-run naphthas, thermally or catalytically cracked naphthas, partially reformed naphthas, raffinates from aromatics extraction and the like. Usually such feedstocks have been hydrotreated to remove contaminants, especially sulfur and nitrogen. A gasoline-range charge stock may be a full-range naphtha having an initial boiling point from about 40° to about 70° C. and an end boiling point within the range from about 160° to about 220° C., or may be a selected fraction thereof.

Operating conditions used for reforming processes usually include an absolute pressure selected within the range from about 100 to about 7000 kPa, with the preferred absolute pressure being from about 350 to about 4250 kPa. Particularly good results are obtained at low pressure, namely an absolute pressure from about 350 to about 2500 kPa. Reforming conditions include a temperature in the range from about 315° to about 600° C. and preferably from about 425° to about 565° C. As is well known to those skilled in the reforming art, the initial selection of the temperature within this broad range is made primarily as a function of the desired octane of the product reformate, considering the characteristics of the charge stock and of the catalyst.

The reforming conditions in the present invention also typically include sufficient hydrogen to provide an amount from about 1 to about 20 moles of hydrogen per mole of hydrocarbon feed entering the reforming zone, with excellent results being obtained when about 2 to about 10 moles of hydrogen are used per mole of hydrocarbon feed likewise, the liquid hourly space velocity (LHSV) used in reforming is selected from the range from about 0.1 to about 10 $hr^{-1}$, with a value in the range from about 1 to about 5 $hr^{-1}$ being preferred.

A multi-functional catalyst composite, which contains a metallic hydrogenation-dehydrogenation component on a porous inorganic oxide support providing acid sites for cracking and isomerization, is usually employed in catalytic reforming. Most reforming catalyst is in the form of spheres or cylinders having an average particle diameter or average cross-sectional diameter from about 1/16" to about 3/16". Catalyst composites comprising platinum on highly purified alumina or on zeolitic supports are particularly well known in the art. Metallic modifiers that improve product yields or catalyst life, such as rhenium, iridium, tin, and germanium, also may be incorporated into the catalyst.

The principal reactions that take place are the dehydrogenation of naphthenes to aromatics, dehydrocyclization of paraffins, isomerization of paraffins and naphthenes, hydrocracking of paraffins to light hydrocarbons, and formation of coke which is deposited on the catalyst. Coke formation causing the catalyst to lose activity gradually over time requires regeneration and/or replacement of the catalyst, and transfer of catalyst from and to the reactor on a continuous basis is highly desirable.

Figure 6:
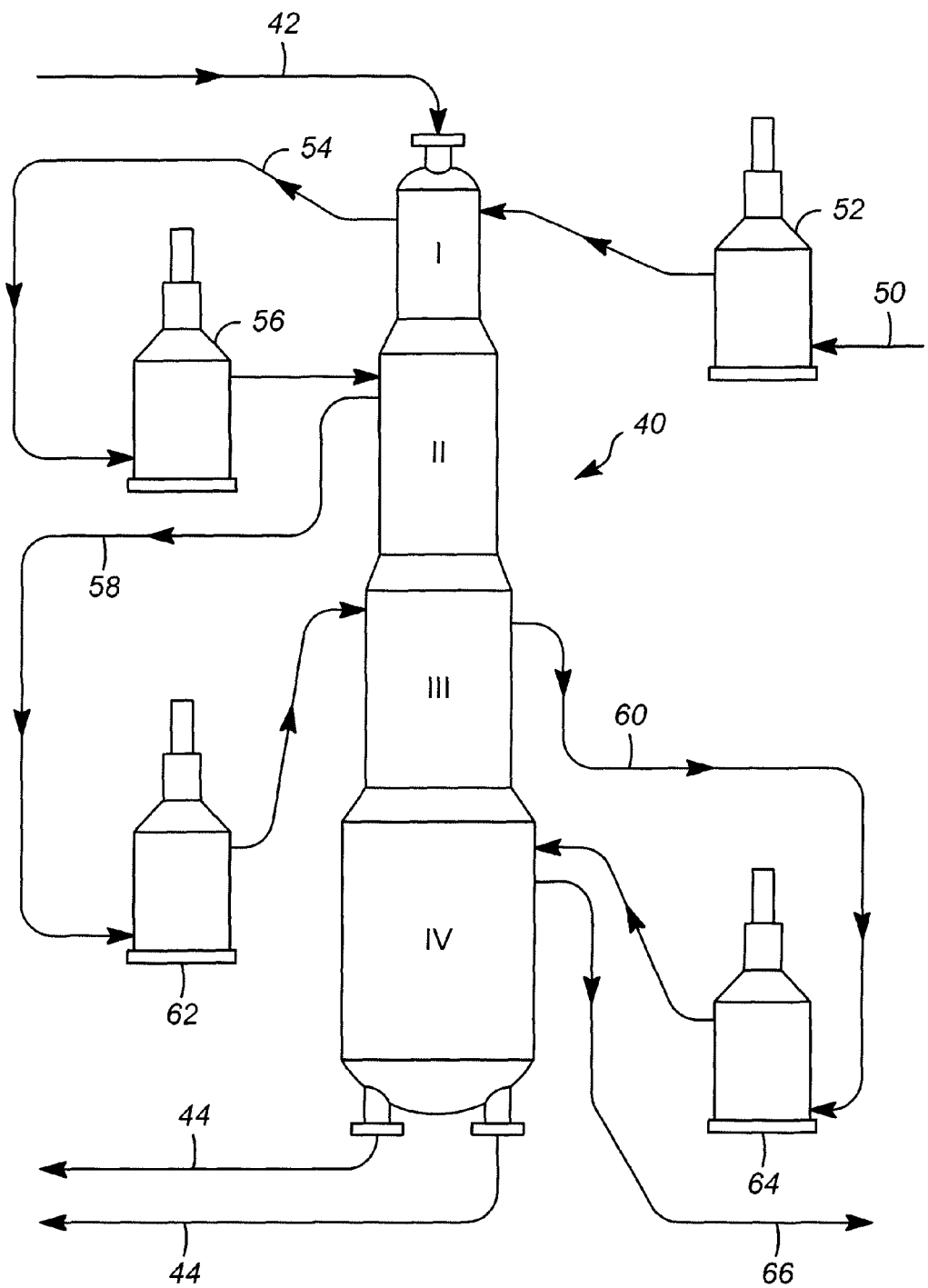
FIG. 6 is a schematic view of a stacked-reactor system.

A reforming reaction section operating with the continuous addition and withdrawal of catalyst particles through a series of radial flow reactors, as illustrated in FIG. 6, thus provides a good example of a fluid/solid contacting apparatus that can benefit from the present invention. The reaction section contains a series of four reactors arranged vertically in a stacked-reactor vessel 40. The individual reactors or reaction zones are identified by numerals I-IV. Catalyst particles enter the top of the stacked-reactor arrangement through catalyst transfer line 42 and pass through the series of four reactors under gravity flow. After passage through each reactor section, the catalyst particles are withdrawn from the bottom of reactor IV by one or more catalyst withdrawal lines 44. Catalyst withdrawn through lines 44 is regenerated by the oxidation and removal of coke deposits in a regeneration zone not shown in this illustration. After regeneration, catalyst particles are again returned to the process by line 42.

The combined hydrocarbon and hydrogen feeds enter the process through a line 50 and pass through a heater 52 to raise its temperature before entering reaction zone I. Partially converted feed is collected from the top of reaction zone I in line 54 and passes through an interstage heater 56 into reaction zone II. Intermediate reactor lines 58 and 60 carry the partially converted feed through reaction zones III and IV, with interstage heaters 62 and 64 respectively bringing the partially converted feed to reaction temperature. A reformate product is recovered from reaction zone IV by a product line 66.

Figure 7:
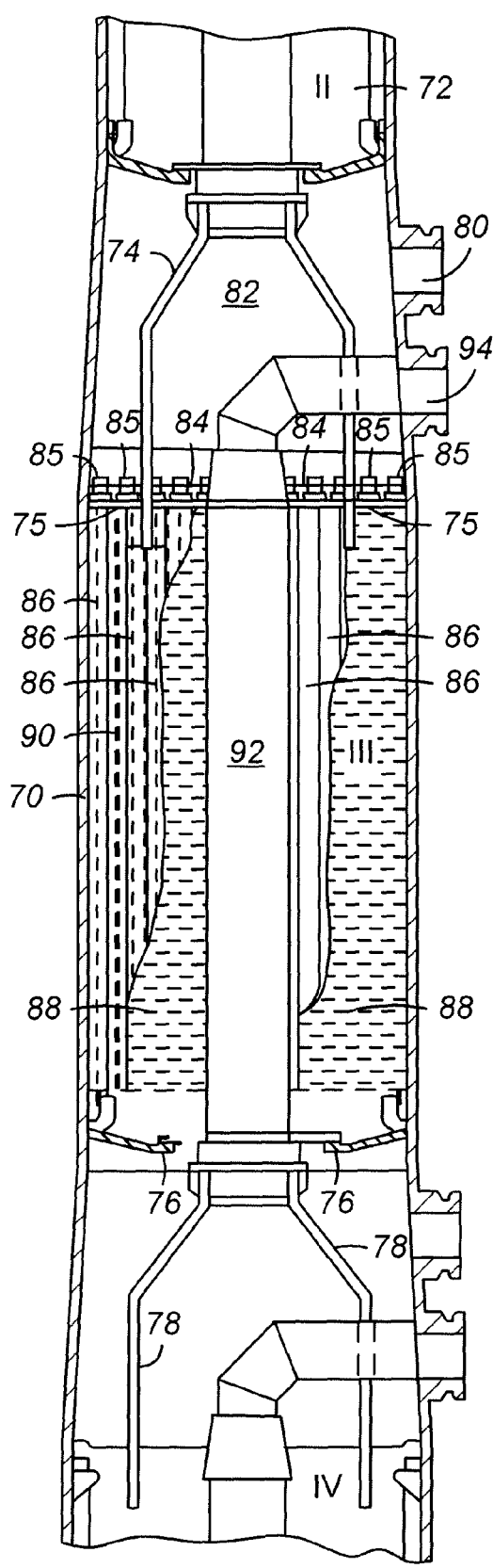
FIG. 7 is a partial sectional view of the reactor of FIG. 6.

As the catalyst passes through the adjacent stacked reactors of FIG. 6, it is retained in a bed in each reactor. The arrangement of the internals for forming is the catalyst bed and effecting fluid-particle contacting in FIG. 7 shows a sectional view of reaction zone III, but is representative of intermediate reaction zone II as well. Catalyst particles (not shown) are transferred from a particle-retaining space 72 in zone II by a series of transfer conduits 74 into reaction zone III. A bed of catalyst particles is formed below the transfer conduits in a particle-retaining space defined by vessel partition or head 76, outer conduit 88 and inner conduit 92. The catalyst particles eventually are withdrawn from zone III through another series of transfer conduits 78 into reaction zone IV for ultimate removal from the stacked reactor.

The partially converted feed enters reaction zone III through a nozzle 80 and flows into a distribution chamber 82. A cover plate 84 extends across the bottom of chamber 82 to separate it from the particle-retaining space. Chamber 82 communicates the feed through a series of risers 85 that extend through the cover plate into the interior of a plurality of vertically-extended cylinders 86; there preferably is provision for a sliding fit between the cover plate 84 and risers 85. Cylinders 86 and outer conduit 88 are as described in FIG. 2 for cylinders 24 and outer conduit 22. Coverplate 90 for the panels defined by cylinders 86 and outer conduit 88 is as described in FIG. 4 for coverplate 36.

The foregoing description is presented only to illustrate certain specific embodiments of the invention, and should not be construed to limit the scope of the invention as set forth in the claims. There are many possible other variations, as those of ordinary skill in the art will recognize, which are within the spirit of the invention.

The invention claimed is:

1. An improved device for distributing fluid in a radial-flow direction through particles within a vertically extended vessel having a curved vessel wall, a fluid inlet and a fluid outlet, comprising:
   a) a plurality of panels, each defined by an arcuate section of a particle-retaining outer conduit having a multiplicity of conduit perforations in the direction of the center of the reactor and substantially parallel to the vessel wall and connected to a plurality portion of cylinders, each of which panels can be brought into the vessel via a vessel opening;
   b) a plurality of vertically extended cylinders, a plurality portion of which is contained in each of the panels, each cylinder having a hollow interior and a multiplicity of cylinder perforations; and at least one end of each cylinder communicating with one of the fluid inlet and the fluid outlet; and,
   c) a perforated central conduit located in the center of said vessel and communicating with the other of said fluid inlet and said fluid outlet that is not communicating with the cylinders.

2. The device of claim 1 further comprising panel enclosure means for enclosing the plurality portion of cylinders in the arcuate section of the outer conduit along the length of the cylinders.

3. The device of claim 2 wherein the enclosure means comprises an arcuate section of an enclosure conduit which parallels the respective arcuate section of the outer conduit and is connected thereto to define the panel containing the plurality portion of cylinders.

4. The device of claim 1 further providing means for connecting each panel to at least one other panel.

5. The device of claim 1 wherein the cylinder perforations and the conduit perforations differ substantially from each other with respect to one or both of configuration and orientation.

* * * * *